Patented June 20, 1939

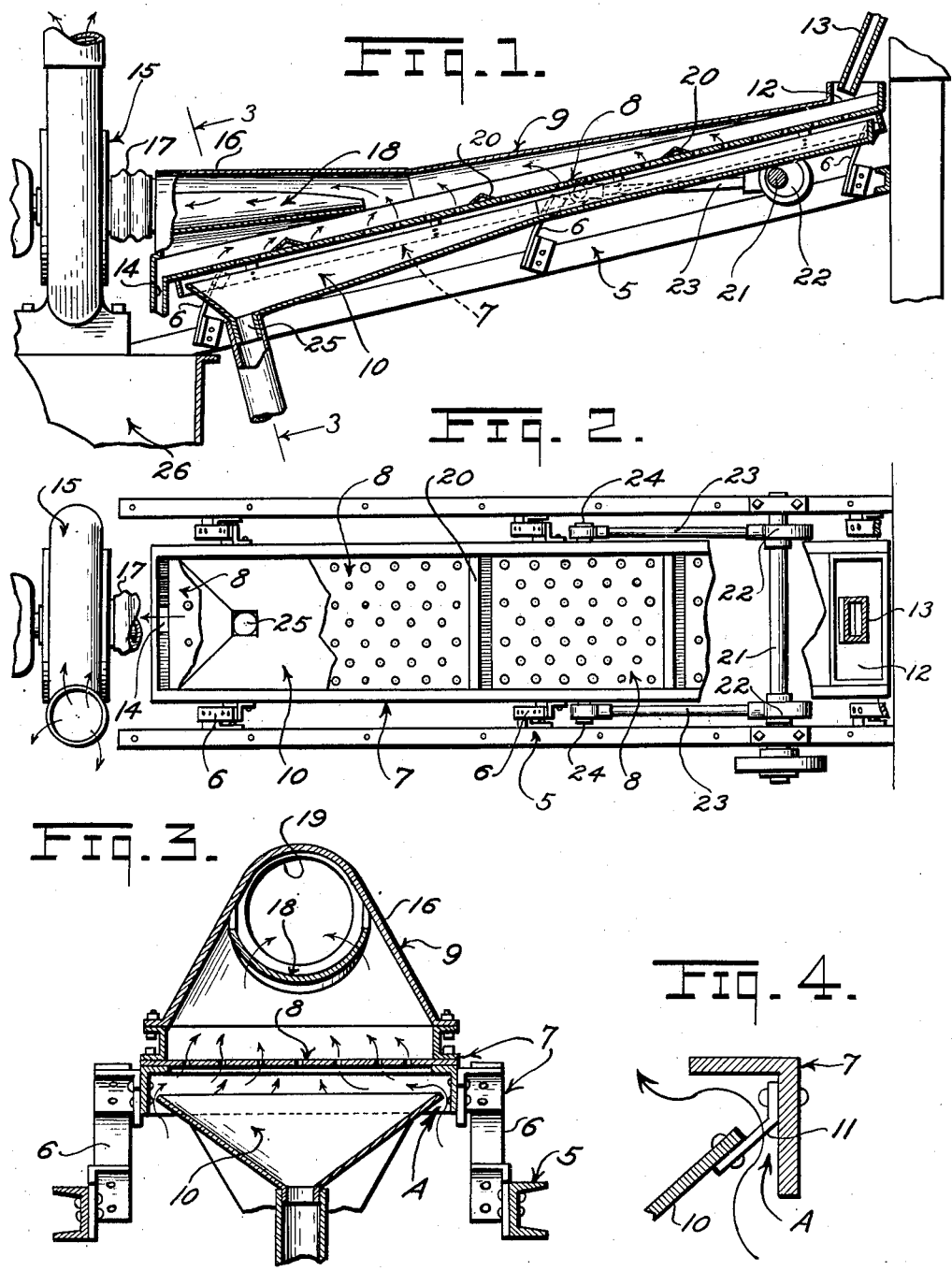

2,163,556

UNITED STATES PATENT OFFICE 2,163,556

PELLET DRIER

Herbert L. Glaze, South Pasadena, Calif., assignor to William K. Booth, doing business as Equipment Engineering Company, Los Angeles, Calif.

Application August 31, 1937, Serial No. 161,789

6 Claims. (Cl. 34—38)

This invention relates to and has for an object the provision of a particularly efficient means for drying poultry and stock feed pellets and the like without breaking or crumbling them and while at the same time separating the whole and nearly whole pellets from the chaff and small pellet fragments which may be delivered to the drier from the pellet mill.

Another object of the invention is to provide a pellet drier such as described which is adapted for efficacious use in connection with a pellet mill such as the one disclosed in my application for patent, Serial No. 137,548, filed April 17, 1937, and will operate to thoroughly dry pellets fed therethrough in a continuous stream.

A further object is to provide a pellet drier of the character described in which atmospheric air is drawn through a perforated drying member and a stream of pellets moving along said member, in such manner as to effectively dry the pellets without requiring the use of heat or other drying media or necessitating such agitation, treatment or handling of the pellets as would break, crumble or objectionably alter the appearance thereof.

Yet another object is to provide a drier such as described wherein the updraft of atmospheric air through a stream of pellets aids in the feed thereof through the drier and also assists in the separation of the whole and nearly whole pellets from the chaff and pellet fragments.

Other objects may appear as the description progresses.

I have shown a preferred form of the invention in the accompanying drawing, subject to modification within the scope of the claims appended hereto, without departing from the spirit of the invention.

In said drawing:

Fig. 1 is a longitudinal sectional view of a pellet drier made in accordance with this invention, Fig. 2 is a top plan view of the drier shown in Fig. 1, with portions broken away for clarity of illustration, Fig. 3 is an enlarged sectional view taken on the plane of line 3—3 of Fig. 1, and Fig. 4 is an enlarged sectional detail, showing the construction which permits the intaking of atmospheric air along opposite sides of the bottom of the drier.

In accordance with this invention, one embodiment thereof, as shown in detail in the accompanying drawing, comprises a stationary inclined frame 5 upwardly from which spring arms 6 extend and are secured to a rectangular and inclined drier frame 7 whereby to support the latter for reciprocal movement. On the upper side of the drier frame are secured a flat inclined perforated plate or screen member 8 and a hood 9 therefor, whereas from the lower side of the drier frame a rectangular waste pan 10 is suspended by means of hangers 11.

At its upper end the hood is provided with a pellet intake opening 12 adapted to receive pellets from a spout 13 or the like, whereas the lower end of said hood is provided with a discharge spout 14 for dried pellets.

A motor operated exhaust fan 15 is connected with the lower enlarged portion 16 of the hood by means of a flexible coupling 17 and operates to induce an intake of atmospheric air along the lower sides of the drier frame 7. In this connection, it will be noted that the upper margins of the waste pan are spaced from the corresponding lower margins of frame 7 to define the air intake openings A around said frame.

A baffle plate 18 of arcuate cross section is positioned above the screen 8 and the discharge opening 19 and extends from the lower end of the hood about one fourth of the length thereof. This baffle provides for a more uniform intaking of air along and throughout the screen as well as for preventing particles of the pellets and chaff from being dropped by the outgoing air stream into and adjacent the pellet spout 14.

At intervals transversely of the screen 8 are inverted V shaped baffle members 20 to regulate the flow of pellets gravitating on the screen.

The entire drier, including frame 7 and screen 8, hood 9 and pan 10, carried thereby, is adapted to be reciprocated by means of a suitably driven shaft 21 having eccentrics 22 which operate connecting rods 23 pivoted to trunnions 24 on the frame 7. But a short reciprocating movement is necessary to insure the flow of pellets on the screen since the updrafts of air will tend to lift or turn over the pellets gravitating downwardly on said screen. It will be noted that the spring arms 6 are positioned so that they will cause the drier to move with a snap motion in an arc forwardly and upwardly whereby the pellets are thrown upwardly and forwardly with respect to the discharge end of the screen. This permits the draft of air to encounter each pellet and to therefore more effectively and quickly dry the pellets during a continuous movement of the pellets along the screen.

It is now seen that with the drier of this invention, pellets to be dried are directed into the opening 12 of the hood 9 onto the upper end of the screen 8. As the drier structure is reciprocated, the pellets thus deposited will gravitate on said screen towards the discharge spout 14. During this flow of pellets on the screen, the exhaust fan 15 will induce an upward flow of air through the air intake openings A and from thence through the perforations of the screen 8. Thus the pellets are agitated to some extent by this updraft of air and are separated and dried thereby quickly and thoroughly. The chaff and fine pellet particles will drop through the screen 8 into the waste pan 10, which may have a discharge spout 25. Dust and fine particles will be carried off with the air stream discharging from the hood 9 into the exhaust fan. The dried pellet may be collected in a bin or hopper 26 or otherwise handled or stored as desired.

I claim:

1. A drier for pellets and the like comprising an inclined perforated screen adapted to have pellets and the like gravitate thereon, means for supporting said screen, a hood mounted on and enclosing the upper side of said screen, exhaust means connected with said hood adjacent the lower end of said screen for inducing a draft of atmospheric air upwardly through the perforations of the screen, and a baffle plate mounted at the lower end of the screen in spaced superposed relation thereto between said screen and said exhaust means.

2. A drier for pellets and the like comprising an inclined perforated screen adapted to have pellets and the like gravitate thereon, means for supporting said screen, a hood mounted on and enclosing the upper side of said screen and having a pellet inlet at the upper end of said screen and an air outlet and a pellet outlet adjacent the lower end of the screen with the air outlet above the pellet outlet, exhaust means connected with the air outlet of said hood for inducing a draft of atmospheric air upwardly through the perforations of the screen, an elongated baffle plate extending between said air outlet and said pellet outlet in upwardly spaced relation to the screen, a waste pan depending from said screen for reception of matter dropping through the screen perforations, and means for reciprocating said screen.

3. A drier for pellets and the like comrising an inclined perforated screen adapted to have pellets and the like gravitate thereon, means for supporting said screen, a hood mounted on and enclosing the upper side of said screen, exhaust means connected with said hood adjacent the lower end of said screen for inducing a draft of atmospheric air upwardly through the perforations of the screen, a baffle plate extending between said exhaust means and the lower end of the screen in upwardly spaced relation to and being substantially parallel with said screen, a waste pan depending from said screen for reception of matter dropping through the screen perforations, and means for reciprocating said screen, said screen supporting means including a stationary frame and spring arms extending upwardly therefrom and operatively connected with said screen.

4. A drier for pellets and the like comprising an elongated drier frame, a perforated screen supported on said frame and adapted to have pellets deposited thereon, a waste pan depending from said frame with its upper margins spaced from said frame to provide air intake openings, an elongated hood mounted on said frame and covering the pellet supporting area of said screen and having pellet intake and discharge openings located adjacent ends of said screen, and exhaust means connected with one end of said hood for inducing an upward draft of air through the perforations of said screen, and means for reciprocating said screen.

5. A drier for pellets and the like comprising an elongated drier frame, a perforated screen supported on said frame and adapted to have pellets deposited thereon, a waste pan depending from said frame with its upper margins spaced from said frame to provide air intake openings, an elongated hood mounted on said frame and covering the pellet supporting area of said screen and having pellet intake and discharge openings located adjacent ends of said screen, exhaust means connected with one end of said hood for inducing an upward draft of air through the perforations of said screen, and means for reciprocating said screen with an upward motion in one direction.

6. A drier for pellets and the like comprising an elongated drier frame, a perforated screen supported on said frame and adapted to have pellets deposited thereon, a waste pan depending from said frame with its upper margins spaced from said frame to provide air intake openings, an elongated hood mounted on said frame and covering the pellet supporting area of said screen and having pellet intake and discharge openings located adjacent ends of said screen, exhaust means connected with one end of said hood for inducing an upward draft of air through the perforations of said screen, and means for reciprocating said screen with an upward motion in one direction, said screen being downwardly inclined in said one direction, and a baffle plate extending from the lower end of said hood over the discharge opening and lower part of said screen and between the latter and said exhaust means.

HERBERT L. GLAZE.